Sept. 14, 1926.
W. GRUDZINSKI
AIRCRAFT
Filed March 28, 1924   3 Sheets-Sheet 2
1,599,521
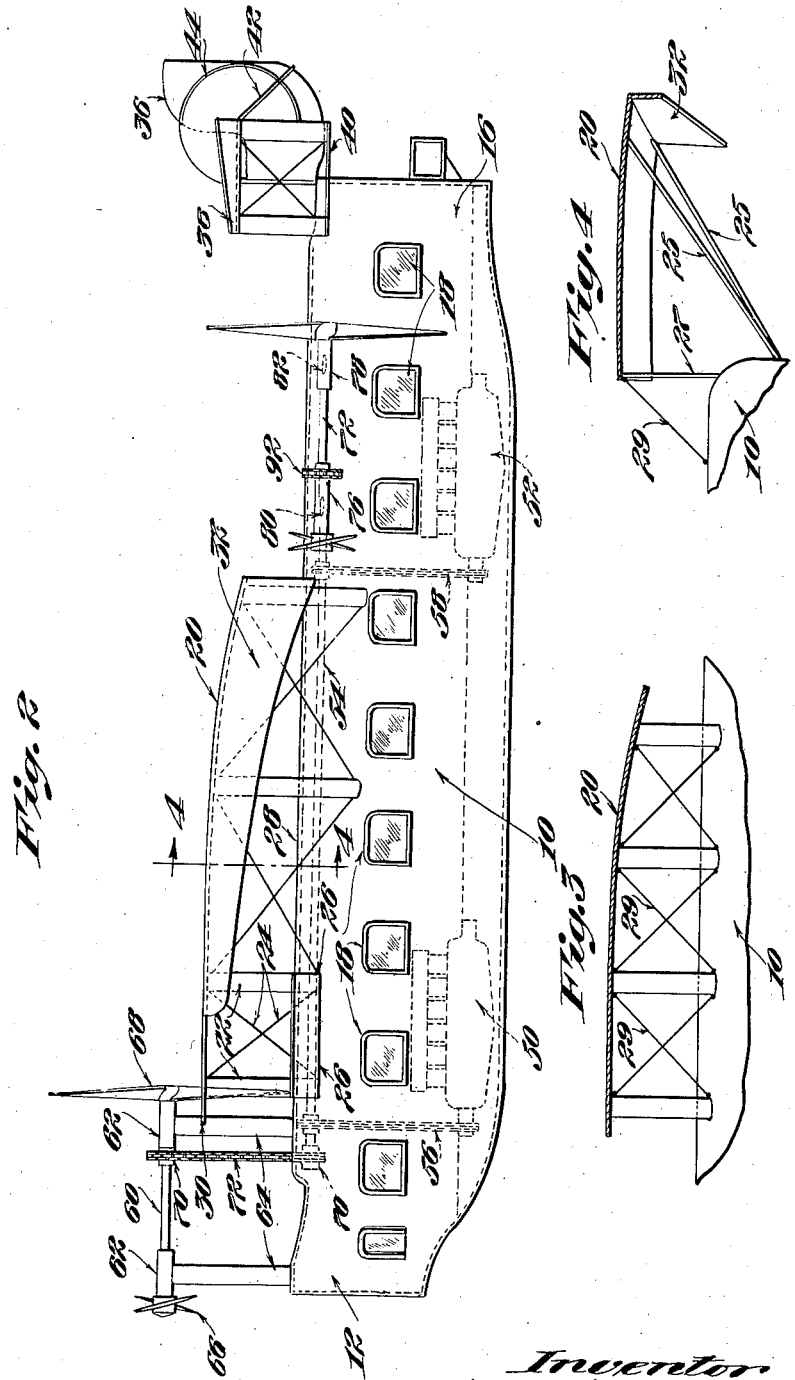

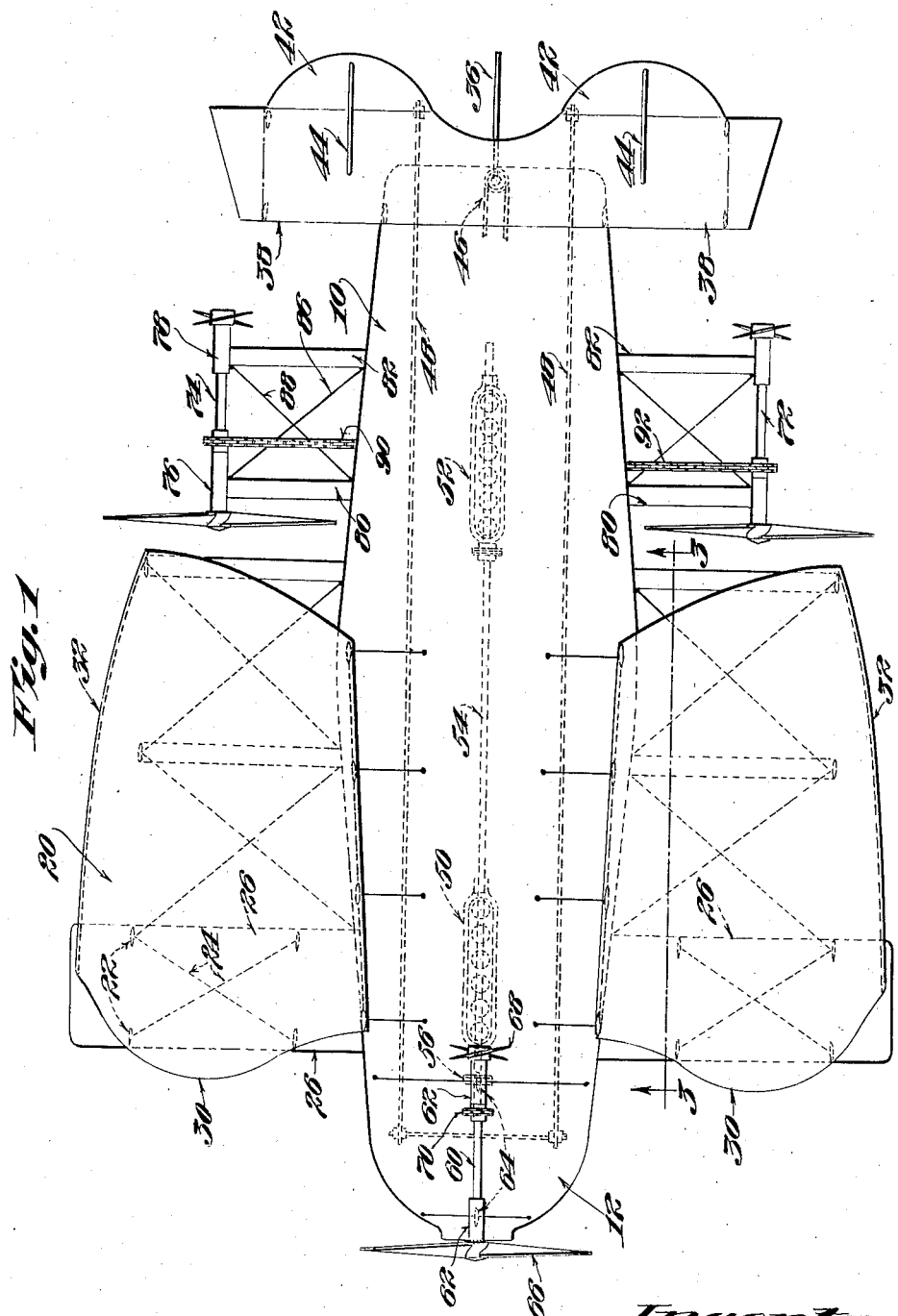

Sept. 14, 1926.
W. GRUDZINSKI
1,599,521
AIRCRAFT
Filed March 28, 1924    3 Sheets-Sheet 3
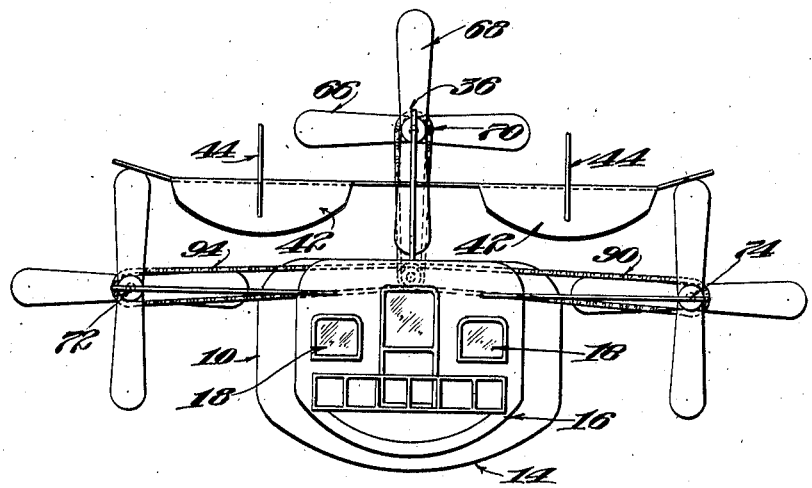
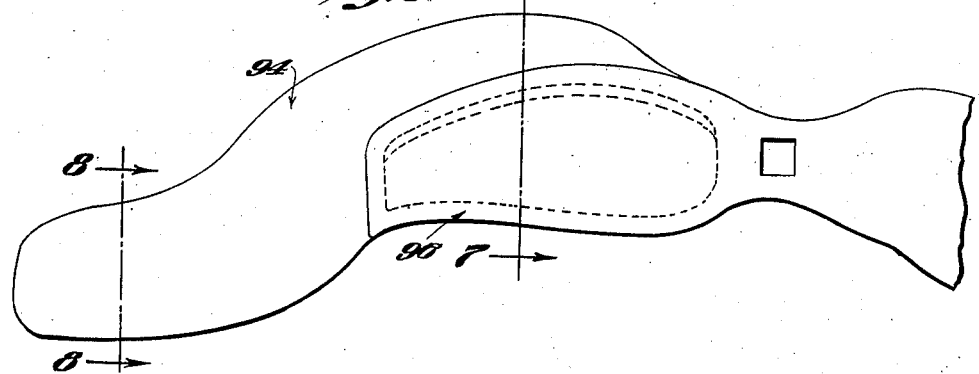
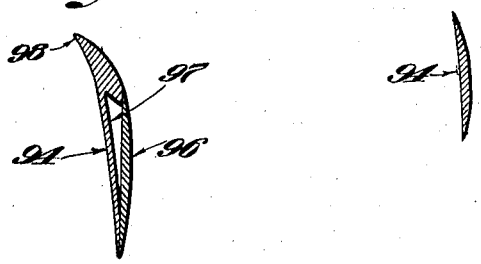
Inventor
Witold Grudzinski
by Francis V. Dakin
Attorney Patented Sept. 14, 1926.

1,599,521

UNITED STATES PATENT OFFICE.

WITOLD GRUDZINSKI, OF BOSTON, MASSACHUSETTS.

AIRCRAFT.

Application filed March 23, 1924. Serial No. 702,556.

This invention relates to aircrafts and more particularly to a hydroplane designed for carrying passengers.

The main object of the invention is the provision of an aircraft of great power, simple and efficient in construction and operation and capable of transporting passengers.

Other objects of the invention will be more specifically set forth and described hereinafter.

The invention consists in the novel features of construction and operation fully set forth and described hereinafter and pointed out and defined in the claims.

In the drawings illustrating one form of my invention, Figure 1 is a top plan view of an aircraft constructed and designed to be operated in accordance with my invention; Fig. 2 is a side elevation of the same; Fig. 3 is a sectional view on line 3—3 in Figure 1; Fig. 4 is a sectional view on line 4—4 in Figure 2; Fig. 5 is a rear end elevation; Fig. 6 is a front elevation of one blade of an improved form of propeller; Fig. 7 is a cross-sectional view on line 7—7 in Figure 6 and Fig. 8 is a cross-sectional view on line 8—8 in Figure 6.

Referring to the drawings showing one exemplification of the invention 10 designates a car designed for the carrying of passengers preferably of elongated shape and having its forward end 12 tapered to diminish resistance to its passage through the air. The bottom 14 of the car may be shaped to facilitate floating on the surface of the water and movement thereon. The rear end 16 may also be tapered for the same reason as the front end and a plurality of windows 18 may be provided along the sides and at both ends of the car to afford vision for the operator and passengers.

On each side of the car in a forward position is arranged a fixed wing 20 its forward portion being supported by struts 22 and wires 24 mounted on a laterally extending auxiliary wing 26. In their rearward portions the wings 20 are braced by diagonal struts 25 and on their inner edges by struts 27 and wires 29. The wings 20 are preferably placed above the flat top 28 of the car and slope slightly downwardly from front to rear. On its front edge 30 each wing is curved forwardly and on its outer side a depending flange portion 32 increasing in depth toward the rear may be provided. The supporting power of the wings 20 is augmented and steadied by the auxiliary wings 26.

On the rear end of the car may be mounted the steering apparatus for controlling the movement of the aircraft in all directions, comprising a rudder 36 and two steering planes, an upper 38 and a lower plane 40, the upper plane 38 being provided with two flaps 42 which may be raised and lowered on circular guide wires 44. The rudder is controlled by means of the steering rope 46 and the flaps by a rope or cable 48 these being arranged in any suitable manner for effecting the desired result. The steering rudder may be pivotally mounted on the top of the rear end of the car.

The motive power may be furnished from two engines 50 and 52 of any suitable construction located in the forward and rearward portions of the car, respectively, preferably in the bottom of the car, and connected to a main shaft 54 arranged close to the top of the car and driven from said engines by chain drives 56 and 58 respectively. On top of the car at its forward end may be mounted a shaft 60 supported in bearings 62 on supports 64 and having fixed on its two ends propellers 66 and 68, the blades of these two propellers being arranged at right angles to each other. The shaft may be driven from the main shaft by means of sprocket-wheels 70 and a chain drive 72. On the rearward portion of the car may be mounted two shafts 72 and 74 adapted to rotate in bearings 76 and 78, respectively, carried by supports 80 and 82, reinforced by wires 86 and 88; each of the shafts carrying two propellers, arranged at right angles to each other. These propellers are driven by chain-drives 90 and 92 from the rear end of the main shaft. The two shafts are arranged on the sides of the car, preferably about on a level with the top of the car.

In Figures 6, 7 and 8, I have shown a novel form of propeller adapted to be constructed of metal, preferably, and made in two sections 94 and 96, the former section being provided with a recess 97 so that the propeller is in effect hollow in its main heavier portion. Each blade of this propeller is curved forwardly so that its forward edge 98 cuts the air first and the forward face of the propeller is convexly curved in order to throw the air out and forward as the propeller revolves.

In operation, the aircraft is adapted to float on water and therefore is designed to leave and to return to that medium. The operation of the propellers causes the car to be moved forwardly on the water and to rise therefrom as soon as sufficient speed has been attained, the air striking the downwardly curved side wings and lifting them. In this action there is of course a tendency for the air as it strikes the side wings to spill laterally which tendency is overcome by the side flanges and by the rearward pull exerted by the rear propellers upon the currents of air striking the side wings.

The steering is done entirely by the rearwardly mounted rudder and steering planes, the rudder controlling movement in a lateral direction and the steering plane flaps movement in a vertical direction.

What I claim is:

1. An aircraft comprising an elongated car adapted for carrying passengers, a pair of wings provided with depending fixed side flanges and arranged one on each side of said car and at a level higher than the top of said car, the long axis of each of said wings being parallel with the long axis of said car, a pair of auxilliary wings, having their long axes perpendicular to the long axis of said car and being each located under the forward end of one of said side wings and means for propelling said aircraft.

2. An aircraft comprising an elongated car adapted to carry passengers having its forward end tapered to reduce the air pressure, a pair of wings, one on either side of said body and arranged above the top thereof, steering planes and a rudder at the rear end of said car arranged upon the top and three pairs of propellers for driving said car, one arranged at the forward end and the other two at the rearward end on each side, the blades of the two propellers in each pair being set at right angles to each other and means for driving said propellers.

3. In an aircraft, the combination of an elongated car for the carriage of passengers and adapted to float on water, a pair of side wings secured to the forward portion of said car, one on each side above the top thereof, the long axes of said side wings being parallel to the long axis of said car and said wings gradually diminishing in width toward the rear, an auxiliary wing under the forward portion of each side wing, the long axis of said auxiliary wing being perpendicular to the long axis of said car and parallel to the short axis of said side wings and means for propelling said aircraft.

4. In an aircraft, the combination of an elongated car for the carriage of passengers and adapted for floating on water, a pair of wings having side flanges and secured to said car above the top thereof, one on each side, the longitudinal axes of said wings being parallel to the longitudinal axis of said car, auxiliary wings under each of said side wings, the longitudinal axes of said auxiliary wings being perpendicular to the longitudinal axis of said car, means for steering said aircraft and means for propelling it in a forward direction.

5. In an aircraft, the combination of an elongated car for the carriage of passengers and adapted for floating on water, a pair of wings having fixed depending side flanges and secured to said car, one on each side thereof, the longitudinal axes of said wings being parallel to the longitudinal axis of said car, and said wings sloping slightly downwardly from front to rear, an auxiliary wing under each side wing, the longitudinal axis of each auxiliary wing being perpendicular to the longitudinal axis of said car, steering means, and propelling means.

6. In an aircraft, the combination of an elongated car for the carriage of passengers and adapted for floating on water, a pair of wings secured to said car at its forward portion and located one on each side slightly above the top of said car, said wings sloping downwardly from front to rear, and each having a fixed side flange, means for propelling said car comprising propellers arranged at the front of the car and behind each of said side wings and means in said car for driving said propellers; the propellers in each group having their blades arranged perpendicularly to each other.

7. An aircraft comprising an elongated car adapted for carrying passengers, a pair of wings, one on each side of said car at a level above the top of said car, each of said wings having a fixed depending outer side flange, a pair of auxiliary wings, one on each side of said car below the forward portion of one of said side wings, the long axis of each of said auxiliary wings being perpendicular to the long axis of said car, means for steering and means for propelling said aircraft.

8. An aircraft comprising an elongated car adapted for carrying passengers, a pair of side wings arranged one on each side of said car at its forward end, the longitudinal axes of said wings being parallel with the longitudinal axis of said car and the forward end of said wing being curved outwardly in a forward direction, and means for propelling said car comprising propellers arranged in pairs, the propellers in each pair being mounted on one shaft one behind the other and having their blades in perpendicular relation to each other.

9. An aircraft comprising a car adapted for carrying passengers, a pair of side wings arranged one on each side of said car at a level thereabove, each of said side wings having its longitudinal axis parallel to the longitudinal axis of said car and slightly curved downwardly toward the rear and each being provided with a fixed depending side flange, a pair of auxiliary wings arranged, one under the forward portion of each side wing, said auxiliary wings having their longitudinal axes perpendicular to the longitudinal axis of said car, means for steering and means for propelling said aircraft.

10. An aircraft comprising an elongated car for carrying passengers, a pair of side wings, one on each side of said car, each of said side wings having its longitudinal axis parallel with the longitudinal axis of said car and being curved slightly downwardly toward the rear and provided with a depending side flange increasing in width toward the rear, a pair of auxiliary wings, one on each side of said car underneath the forward portion of a side wing and having its longitudinal axis perpendicular to the longitudinal axis of said car, means for steering and means for propelling said aircraft.

In witness whereof, I hereunto set my hand this seventeenth day of January, 1924.

WITOLD GRUDZINSKI.